Sept. 6, 1955  G. H. TYNE  2,717,300
THERMAL-EXPANSION EXTREME-PRESSURE APPARATUS
Filed Dec. 15, 1953
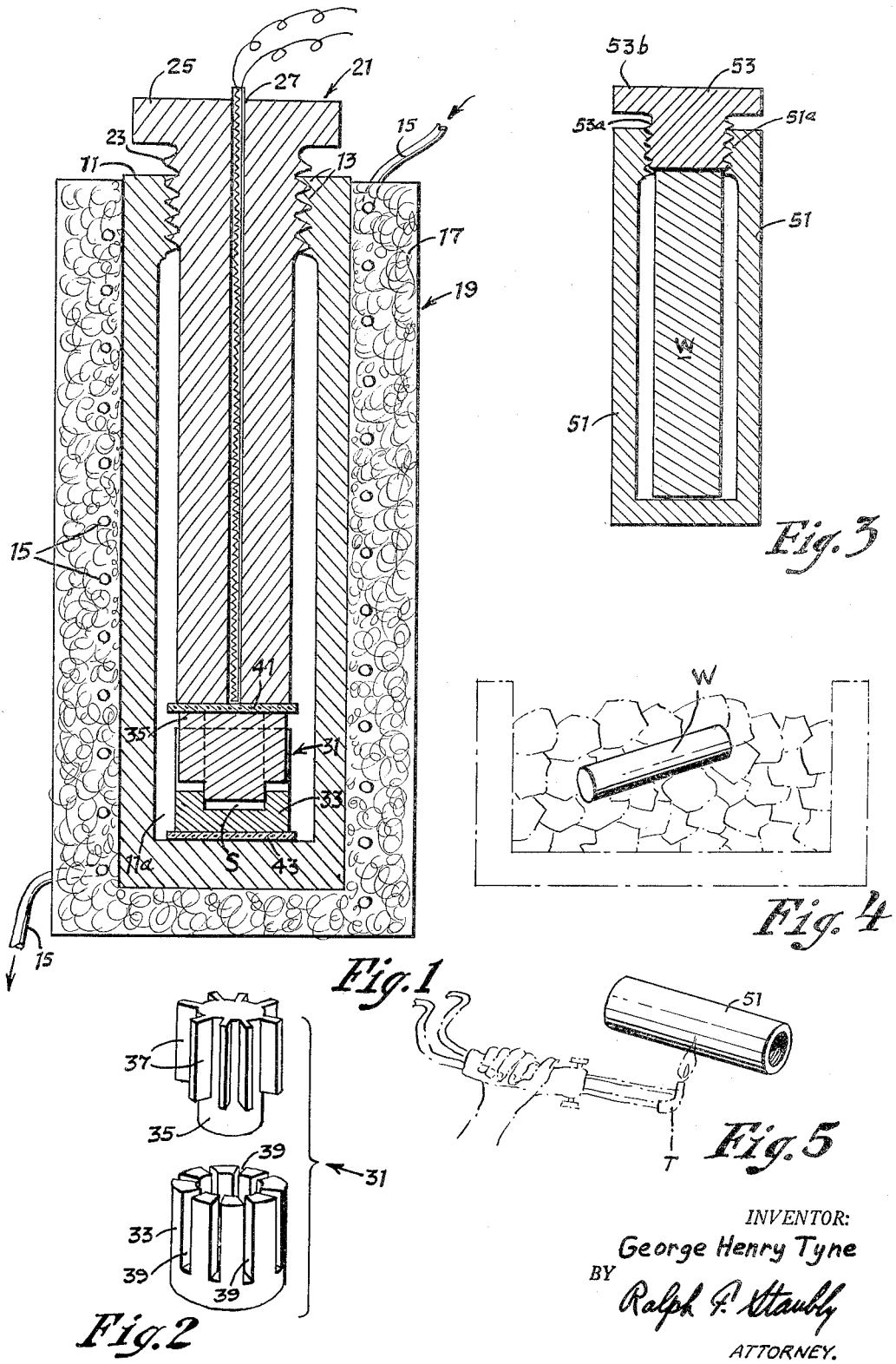
INVENTOR:
George Henry Tyne
BY
Ralph F. Staubly
ATTORNEY.

United States Patent Office 2,717,300
Patented Sept. 6, 1955

2,717,300

THERMAL-EXPANSION EXTREME-PRESSURE APPARATUS

George Henry Tyne, Nashville, Tenn.

Application December 15, 1953, Serial No. 398,391

8 Claims. (Cl. 219—1)

This invention relates to thermal-expansion extreme-pressure apparatus.

More particularly this invention relates to apparatus for exerting extremely high pressures upon bodies by utilizing differential expansion between parts of the apparatus, and/or the work material being operated upon, by differential thermal expansion and contraction.

Specifically, this invention relates to apparatus for applying, by differential thermal expansion and contraction, extremely high pressures upon test samples or the like, said apparatus being designed for obtaining extreme pressures by having different parts of the apparatus and/or work pieces subjected to both high and low temperatures relative to the ambient, with said parts relatively closely approaching the ambient temperature at the time of maximum pressure application.

While it has heretofore been proposed to exert extremely high pressures upon test samples or work pieces by the use of the principles of thermal expansion, the prior art has not disclosed the herein-taught apparatus and method in which said extreme pressures are produced without excessively high or excessively low temperatures being required in any part of the apparatus. This is the result of the conception of co-temporally heating and cooling different parts of the apparatus and/or work to produce the pressures desired.

It is accordingly an object of this invention to provide method and apparatus for applying extremely high pressures through thermal expansion and contraction of parts of the apparatus in such manner that said parts and the work piece approach ambient temperature from vectorially opposite directions.

It is a further object of the invention to provide method and apparatus for applying high pressure to a sample by the use of a pair of pressure-applying members, one of which is heated and the other of which is cooled above and below the ambient temperature, respectively, to effect the desired application of pressure, the heating and cooling of said members and their return to ambient temperature being so arranged that the sample or work piece is neither greatly heated nor cooled in the process.

It is a further object of the invention to provide method and apparatus for applying extreme pressures to a solid body by the simultaneous expansion of said body after cooling and contraction of said apparatus after heating and being clamped around said body.

It is a further object of the invention to provide a holder for a work piece or sample to be pressurized, which holder effectively holds said sample or work piece at a temperature intermediate the temperatures of the heated and cooled portions of the system.

These and other objects and advantages of the invention will become apparent as the following detailed description thereof proceeds.

In the drawings which illustrate certain preferred embodiments of the invention and in which like reference characters refer to the same parts throughout the several views:

Fig. 1 is an elevational view, in vertical axial section, of a preferred embodiment of the invention.

Fig. 2 is an exploded perspective view of the heat-exchanger sample-holder of Fig. 1.

Fig. 3 is an elevational view, in vertical axial section through a modified and simplified form of the invention.

Fig. 4 is an elevational view, mostly in phantom, showing the specimen of Fig. 3 being cooled, as in an ice container.

Fig. 5 is a perspective view partly in phantom and schematically showing the compression cylinder of Fig. 3 being pre-heated.

With reference now to Figs. 1 and 2 of the drawings, the numeral 11 designates a heavy-walled hollow cylindrical body formed of steel or other alloy having a high tensile strength and preferably a high coefficient of thermal expansion. Cylinder 11 is closed at its bottom and is provided at its throat with very heavy threads 13. The cylinder 11 is closely surrounded by conventional refrigerating coils 15 by which it may be cooled to any desired or practical sub-normal temperature. For greater efficiency, coils 15 are surrounded by any suitable heat-insulating materials 17, conveniently packed within a container or housing 19.

Adapted to nest within the bore or hollow chamber 11a of the massive tubular body 11 is a massive cylindrical member, generally designated 21, having massive threads 23 for mating engagement with the threads 13 on the cylindrical body 11. Body 21 is also formed of a material having a high thermal coefficient of expansion and preferably one having a very high compressive strength. Body 21 desirably has a non-circular flanged upper extremity or cap 25 for engagement by a wrench or other tool while the parts 11 and 21 are being screwed together or disengaged. Preferably the body 21 is axially and centrally bored to receive a conventional heating means (herein shown schematically as being an electric heater 27). Heater 27 is designed to impart to the body 21 elevated temperatures of any desired or convenient degree. It is contemplated, but not necessary, that the elevated temperatures imparted to the body 21, and the reduced temperatures imparted to the cylindrical tubular body 11, should be in the order of numerically approximately equal elevated and lowered values. The purpose of this would be to permit substantially the same cross sectional area, and thereby approximately the same mass of material, to be used in each of the members 11 and 21. This in turn would result in approximately the same amount of heat-storage in one, and heat-extraction from the other body in producing the desired pressure effects. Thus upon withdrawal of heating and cooling effects, heat-exchange between the bodies 11 and 21 will balance out and neutralize each other thereby restoring the system quickly to ambient temperature.

To protect the sample S (Fig. 1) from unduly high or low temperature effects, said sample S may be enclosed within a holder 31 formed of a material having a very high heat-conductivity. Holder 31 comprises a cylindrical base member 33 having a vertically arranged tubular axial bore therein, and a co-operating cylindrical body 35 adapted to be nested therein. Plug 35 preferably has a plurality of vertically and radially extending webs or fins 37, and the body 33 has a similar number of vertically extending slots 39 for slidably receiving the fins 37. The fins 37 and the slots 39 provide good heat-exchange between parts 33 and 35 so that heat unavoidably flowing into the holder 31 from the electrically heated body 21 will be conducted around sample S and into the body 33 for transfer therefrom to the cooled outer cylindrical body 11.

As a further refinement to minimize heat flow to and through holder 31, there may be interposed between the top surface of the plug 35 and the bottom surface of the body 23 (Fig. 1) an insulating sheet or disc 41. A similar disc 43 should be interposed between the bottom of the body 33 and the bottom of the chamber 11a. Discs 41 and 43 should be constructed of a very good heat-insulating material and one which can withstand very high compressive pressures.

With reference now to Figs. 3–5 of the drawings, the numeral 51 generally designates a hollow cylindrical pressure-exerting body formed of a material having great tensile strength and a relatively high thermal coefficient of expansion. Body 51 is also provided with massive threads 51a in its throat. A plug 53 is adapted for threaded engagement at 53a with the threads 51a. Plug 53 also has an enlarged non-circular flanged upper portion or cap 53b for engagement by a wrench or other tool for assemblage or disassemblage of the apparatus.

Compressed between the cap 53 and the bottom of the hollow cylinder 51 is a work piece W which is herein shown as being a cylindrical body of a length approximately equal to the non-threaded portion of the chamber in the cylindrical body 51. In Fig. 4 the work piece W is shown resting in a mass of ice, or Dry Ice, etc., to schematically illustrate the pre-cooling of the work-piece W to a temperature considerably below normal ambient temperature. In Fig. 5 the compression cylinder 51 is schematically shown as being heated to an elevated temperature by a torch T. The work piece could be dies for coalescing powdered metals, etc.

With the work piece W cooled to a sub-normal temperature, and with the compression cylinder 51 heated to an elevated temperature, the parts are assembled as shown in Fig. 3 and the plug 53 is tightly screwed down onto the top of the work piece W. Then as the cylindrical body 51 loses heat both to the ambient air and to the work piece W, both of said parts tend to approach room or ambient temperature. These temperature changes cause, first, a strong contraction of the cylindrical body 51 and a strong pressure-exerting expansion of the work piece W to thereby effect a very high compressive pressure upon said work piece W. When the parts have reached ambient temperature, pressure has reached a maximum. The pitch of the threads 51a and 53a are preferably of such value that the plug 53 can be unscrewed from the body 51 without too great a torque requirement.

It should here be noted that the pressures effected by the pre-heating and pre-cooling, and the subsequent normalizing of the temperatures of the parts, produce compressive forces greatly in excess of that which could be obtained by screwing plug 53 down against work piece W, since the friction in the threads would become excessive as the pressure built up. However, for unscrewing, the action is assisted by the co-operatively induced pressures.

Thus it is seen that I have herein disclosed method and apparatus for producing extremely high pressures without the necessity of subjecting work pieces to either extremely high or extremely low temperatures which could either alter the chemical or physical characteristics of the work pieces or result in time-consuming and/or dangerous operations. My method and apparatus also greatly reduce the dangers and the time element by providing both high and low temperature and heat-storage values of approximately equal and opposite quantities for neutralization of each other.

While I have disclosed certain preferred embodiments of my invention, it is to be understood that many changes can be made in the size, shape, composition and arrangements of the parts without departing from the spirit of the invention as defined by the subjoined claims.

Having thus described my invention, what I claim as new and desire to secure by Letters Patent of the United States is:

1. Extreme pressure apparatus, comprising: a first body having a relatively high tensile strength, a second body having a relatively high compressive strength, both of said bodies having relatively high positive coefficients of thermal expansion, said bodies being co-extensive for a considerable portion of one of their major dimensions, being rigidly connectable together adjacent one end of their co-extent, and having portions adjacent the other end of said co-extent presenting opposed pressure-exerting surfaces, and means for simultaneously cooling said first body and heating said second body, whereby the thereby induced contraction of said first body and expansion of said second body will cause a high-pressure-producing relative movement between said opposed surfaces.

2. Structure according to claim 1, said bodies being adapted for external heating and external cooling, respectively, before assembly, whereby upon their return to ambient temperature after assembly, very high pressures will result therebetween.

3. Structure according to claim 1, said first body including means closely associated therewith for cooling the same below ambient temperature, and said second body including means closely associated therewith for heating the same above ambient temperature, to thereby create extreme pressures therebetween.

4. Structure according to claim 3, said cooling means comprising refrigerating coils and an insulating jacket therearound, and said heating means comprising an electric heater embedded in said second body.

5. Structure according to claim 1 and additionally comprising a heat-distributing jacket for surrounding a work piece so as to shunt heat around the same to protect said work piece from damagingly high or low temperatures.

6. Structure according to claim 5, said jacket comprising telescoping members having interlacing heat-exchanging fingers formed thereon.

7. Structure according to claim 6, and additionally including heat-insulating sheets interposed between said opposed pressure-exerting surfaces and said jacket.

8. Structure according to claim 3, said bodies having comparable heat-storage capacities such that they accelerate return of the temperature of each other to the ambient value by heat-exchange therebetween.

References Cited in the file of this patent

UNITED STATES PATENTS

| | | |
|---|---|---|
| 1,246,909 | Goldschmidt et al. | Nov. 20, 1917 |
| 1,561,224 | Fritsche | Nov. 10, 1925 |
| 1,766,865 | Williams | June 24, 1930 |
| 2,231,027 | Remmer | Feb. 11, 1941 |
| 2,306,709 | Miller | Dec. 29, 1942 |
| 2,397,308 | Barnes | Mar. 26, 1946 |
| 2,585,818 | Moravec | Feb. 12, 1952 |